United States Patent
Gass et al.

(10) Patent No.: US 6,997,090 B2
(45) Date of Patent: Feb. 14, 2006

(54) SAFETY SYSTEMS FOR POWER EQUIPMENT

(75) Inventors: Stephen F. Gass, Wilsonville, OR (US); David A. Fanning, Vancouver, WA (US); J. David Fulmer, Tualatin, OR (US); David S. D'Ascenzo, Portland, OR (US); Jonathan N. Betts-LaCroix, Chatsworth, CA (US); Robert L. Chamberlain, Raleigh, NC (US); Joel F. Jensen, Redwood City, CA (US); Andrew L. Johnston, Redwood City, CA (US); Sung H. Kim, Palo Alto, CA (US); Anwyl M. McDonald, Palo Alto, CA (US); Benjamin B. Schramm, Los Gatos, CA (US)

(73) Assignee: SD3, LLC, Wilsonville, OR (US)

( * ) Notice: Subject to any disclaimer, the term of this patent is extended or adjusted under 35 U.S.C. 154(b) by 105 days.

(21) Appl. No.: 10/785,361

(22) Filed: Feb. 23, 2004

(65) Prior Publication Data

US 2004/0163514 A1 Aug. 26, 2004

Related U.S. Application Data

(63) Continuation of application No. 10/215,929, filed on Aug. 9, 2002, now abandoned
(60) Provisional application No. 60/312,141, filed on Aug. 13, 2001.

(51) Int. Cl.
*B26D 5/00* (2006.01)
*B26D 7/24* (2006.01)
*B27B 5/18* (2006.01)

(52) U.S. Cl. .................. 83/58; 83/62.1; 83/72; 83/471.3; 83/477.1; 83/477.2; 83/473; 83/488; 83/490; 83/581; 83/DIG. 1; 192/129 R; 192/138; 30/388; 144/382; 144/356; 144/154.5

(58) Field of Classification Search ............ 192/192 R, 192/133, 148, 144, 137, 138; 403/2, 28; 411/2, 411/89, 390; 385/142; 144/356, 384, 391, 144/427, 154.5; 292/DIG. 66; 307/116, 142, 307/131; 337/190, 237, 239, 1, 5, 10, 17, 337/70, 140, 148, 170; 361/1, 124; 340/590, 340/680; 83/DIG. 1, 58, 62.1, 526, 72, 76.8, 83/471.2, 397, 473, 477.1, 485, 487, 490, 83/491, 522.12, 544, 546, 564, 581, 590, 83/665, 471.3; 30/382, 381
See application file for complete search history.

(56) References Cited

U.S. PATENT DOCUMENTS 146,886 A    1/1874    Doane et al.
162,814 A    5/1875    Graves et al.

(Continued)

FOREIGN PATENT DOCUMENTS

CH      297525      6/1954
DE      76186      8/1921

(Continued)

OTHER PUBLICATIONS

Gordon Engineering Corp., Product Catalog, Oct. 1997, pp. cover, 1,3 and back, Brookfield, Connecticut, US.
U.S. Provisional Patent Appl. No. 60/157,340, filed Oct. 1, 1999, entitled "Fast–Acting Safety Stop.".

(Continued)

*Primary Examiner*—Boyer D. Ashley
(74) *Attorney, Agent, or Firm*—SD3

(57) ABSTRACT

A saw with a safety system is disclosed. The safety system includes a detection system adapted to detect contact between a person and a blade while the blade is moving. The safety system further includes a brake system adapted to engage the blade and to stop the blade when the detection system detects contact between the person and the blade.

20 Claims, 2 Drawing Sheets

U.S. PATENT DOCUMENTS

| | | |
|---|---|---|
| 261,090 A | 7/1882 | Grill |
| 264,412 A | 9/1882 | Kuhlmann |
| 299,480 A | 5/1884 | Kuhlmann et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchison |
| 1,551,900 A | 9/1925 | Morrow |
| 1,553,996 A | 9/1925 | Federer |
| 1,582,483 A | 4/1926 | Runyan |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,425,331 A | 8/1947 | Kramer |
| 2,434,174 A | 1/1948 | Morgan |
| 2,466,325 A | 4/1949 | Ocenasek |
| 2,496,613 A | 2/1950 | Woodward |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,572,326 A | 10/1951 | Evans |
| 2,590,035 A | 3/1952 | Pollak |
| 2,593,596 A | 4/1952 | Olson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,722,246 A | 11/1955 | Arnoldy |
| 2,731,049 A | 1/1956 | Akin |
| 2,736,348 A | 2/1956 | Nelson |
| 2,758,615 A | 8/1956 | Mastriforte |
| 2,785,710 A | 3/1957 | Mowery, Jr. |
| 2,786,496 A | 3/1957 | Eschenburg |
| 2,810,408 A | 10/1957 | Boice et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,894,546 A | 7/1959 | Eschenburg |
| 2,913,025 A | 11/1959 | Richards |
| 2,945,516 A | 7/1960 | Edgemond, Jr. et al. |
| 2,954,118 A | 9/1960 | Anderson |
| 2,978,084 A | 4/1961 | Vilkaitis |
| 2,984,268 A | 5/1961 | Vuichard |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,047,116 A | 7/1962 | Stiebel et al. |
| 3,085,602 A | 4/1963 | Gaskell |
| 3,105,530 A | 10/1963 | Peterson |
| 3,129,731 A | 4/1964 | Tyrrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |
| 3,224,474 A | 12/1965 | Bloom |
| 3,232,326 A | 2/1966 | Speer et al. |
| 3,249,134 A | 5/1966 | Vogl et al. |
| 3,306,149 A | 2/1967 | John |
| 3,315,715 A | 4/1967 | Mytinger |
| 3,323,814 A | 6/1967 | Phillips |
| 3,356,111 A | 12/1967 | Mitchell |
| 3,386,322 A | 6/1968 | Stone et al. |
| 3,454,286 A | 7/1969 | Anderson et al. |
| 3,538,964 A | 11/1970 | Warrick et al. |
| 3,540,338 A | 11/1970 | McEwan et al. |
| 3,554,067 A | 1/1971 | Scutella |
| 3,581,784 A | 6/1971 | Warrick |

| | | | |
|---|---|---|---|
| 3,597,809 A * | 8/1971 | Crane ..................... 16/48.5 |
| 3,613,748 A | 10/1971 | De Pue |
| 3,670,788 A | 6/1972 | Pollak et al. |
| 3,675,444 A | 7/1972 | Whipple |
| 3,680,609 A | 8/1972 | Menge |
| 3,695,116 A | 10/1972 | Baur |
| 3,696,844 A | 10/1972 | Bernatschek |
| 3,745,546 A | 7/1973 | Struger et al. |
| 3,749,933 A | 7/1973 | Davidson |
| 3,754,493 A | 8/1973 | Niehaus et al. |
| 3,772,590 A | 11/1973 | Mikulecky et al. |
| 3,785,230 A | 1/1974 | Lokey |
| 3,805,639 A | 4/1974 | Peter |
| 3,805,658 A | 4/1974 | Scott et al. |
| 3,808,932 A | 5/1974 | Russell |
| 3,827,039 A * | 7/1974 | Agnese ..................... 340/586 |
| 3,829,850 A | 8/1974 | Guetersloh |
| 3,858,095 A | 12/1974 | Friemann et al. |
| 3,861,016 A | 1/1975 | Johnson et al. |
| 3,880,032 A | 4/1975 | Green |
| 3,889,567 A | 6/1975 | Sato et al. |
| 3,922,785 A | 12/1975 | Fushiya |
| 3,924,688 A | 12/1975 | Cooper et al. |
| 3,931,727 A | 1/1976 | Luenser |
| 3,946,631 A | 3/1976 | Malm |
| 3,947,734 A | 3/1976 | Fyler |
| 3,949,636 A | 4/1976 | Ball et al. |
| 3,953,770 A | 4/1976 | Hayashi |
| 3,967,161 A | 6/1976 | Lichtblau |
| 3,994,192 A | 11/1976 | Faig |
| 4,007,679 A | 2/1977 | Edwards |
| 4,026,174 A | 5/1977 | Fierro |
| 4,026,177 A | 5/1977 | Lokey |
| 4,030,061 A * | 6/1977 | Gaskell et al. ............... 337/409 |
| 4,047,156 A | 9/1977 | Atkins |
| 4,048,886 A | 9/1977 | Zettler |
| 4,060,160 A | 11/1977 | Lieber |
| 4,070,940 A | 1/1978 | McDaniel et al. |
| 4,075,961 A | 2/1978 | Harris |
| 4,077,161 A | 3/1978 | Wyle et al. |
| 4,085,303 A | 4/1978 | McIntyre et al. |
| 4,090,345 A | 5/1978 | Harkness |
| 4,091,698 A | 5/1978 | Obear et al. |
| 4,117,752 A | 10/1978 | Yoneda |
| 4,145,940 A | 3/1979 | Woloveke et al. |
| 4,152,833 A | 5/1979 | Phillips |
| 4,161,649 A | 7/1979 | Klos et al. |
| 4,175,452 A | 11/1979 | Idel |
| 4,190,000 A | 2/1980 | Shaull et al. |
| 4,195,722 A | 4/1980 | Anderson et al. |
| 4,199,930 A | 4/1980 | Lebet et al. |
| 4,249,117 A | 2/1981 | Leukhardt et al. |
| 4,249,442 A | 2/1981 | Fittery |
| 4,267,914 A | 5/1981 | Saar |
| 4,270,427 A | 6/1981 | Colberg et al. |
| 4,276,799 A | 7/1981 | Muehling |
| 4,281,309 A * | 7/1981 | Olson ..................... 337/409 |
| 4,291,794 A | 9/1981 | Bauer |
| 4,305,442 A | 12/1981 | Currie |
| 4,321,841 A | 3/1982 | Felix |
| 4,366,465 A * | 12/1982 | Veneziano ............... 280/735 |
| 4,372,202 A | 2/1983 | Cameron |
| 4,391,358 A | 7/1983 | Haeger |
| 4,418,597 A | 12/1983 | Krusemark et al. |
| 4,466,233 A | 8/1984 | Thesman |
| 4,470,046 A | 9/1984 | Betsill |
| 4,510,489 A | 4/1985 | Anderson, III et al. |
| 4,512,224 A | 4/1985 | Terauchi |
| 4,518,043 A | 5/1985 | Anderson et al. |
| 4,532,501 A | 7/1985 | Hoffman |
| 4,532,844 A | 8/1985 | Chang et al. |
| 4,557,168 A | 12/1985 | Tokiwa |
| 4,560,033 A | 12/1985 | DeWoody et al. |
| 4,566,512 A | 1/1986 | Wilson |
| 4,573,556 A | 3/1986 | Andreasson |
| 4,576,073 A | 3/1986 | Stinson |
| 4,589,047 A | 5/1986 | Gaus et al. |
| 4,589,860 A | 5/1986 | Brandenstein et al. |
| 4,599,597 A | 7/1986 | Rotbart |
| 4,599,927 A | 7/1986 | Eccardt et al. |
| 4,606,251 A | 8/1986 | Boileau |
| 4,615,247 A | 10/1986 | Berkeley |
| 4,621,300 A | 11/1986 | Summerer |
| 4,625,604 A | 12/1986 | Handler et al. |
| 4,637,188 A | 1/1987 | Crothers |
| 4,637,289 A | 1/1987 | Ramsden |
| 4,644,832 A | 2/1987 | Smith |
| 4,653,189 A | 3/1987 | Andreasson |
| 4,657,428 A | 4/1987 | Wiley |
| 4,679,719 A | 7/1987 | Kramer |
| 4,722,021 A | 1/1988 | Hornung et al. |
| 4,751,603 A | 6/1988 | Kwan |
| 4,756,220 A | 7/1988 | Olsen et al. |
| 4,757,881 A | 7/1988 | Jonsson et al. |
| 4,792,965 A | 12/1988 | Morgan |
| 4,805,504 A | 2/1989 | Fushiya et al. |
| 4,840,135 A | 6/1989 | Yamauchi |
| 4,864,455 A | 9/1989 | Shimomura et al. |
| 4,875,398 A | 10/1989 | Taylor et al. |
| 4,906,962 A | 3/1990 | Duimstra |
| 4,934,233 A | 6/1990 | Brundage et al. |
| 4,937,554 A | 6/1990 | Herman |
| 4,965,909 A | 10/1990 | McCullough et al. |
| 5,020,406 A | 6/1991 | Sasaki et al. |
| 5,025,175 A | 6/1991 | Dubois, III |
| 5,046,426 A | 9/1991 | Julien et al. |
| 5,052,255 A | 10/1991 | Gaines |
| 5,074,047 A | 12/1991 | King |
| 5,081,406 A | 1/1992 | Hughes et al. |
| 5,082,316 A | 1/1992 | Wardlaw |
| 5,083,973 A | 1/1992 | Townsend |
| 5,086,890 A | 2/1992 | Turczyn et al. |
| 5,119,555 A | 6/1992 | Johnson |
| 5,122,091 A | 6/1992 | Townsend |
| 5,174,349 A | 12/1992 | Svetlik et al. |
| 5,184,534 A | 2/1993 | Lee |
| 5,198,702 A | 3/1993 | McCullough et al. |
| 5,199,343 A | 4/1993 | OBanion |
| 5,201,684 A | 4/1993 | DeBois, III |
| 5,207,253 A | 5/1993 | Hoshino et al. |
| 5,212,621 A | 5/1993 | Panter |
| 5,218,189 A | 6/1993 | Hutchison |
| 5,231,359 A | 7/1993 | Masuda et al. |
| 5,231,906 A | 8/1993 | Kogej |
| 5,239,978 A | 8/1993 | Plangetis |
| 5,245,879 A | 9/1993 | McKeon |
| 5,257,570 A | 11/1993 | Shiotani et al. |
| 5,265,510 A | 11/1993 | Hoyer-Ellefsen |
| 5,272,946 A | 12/1993 | McCullough et al. |
| 5,276,431 A | 1/1994 | Piccoli et al. |
| 5,285,708 A | 2/1994 | Bosten et al. |
| 5,320,382 A | 6/1994 | Goldstein et al. |
| 5,321,230 A | 6/1994 | Shanklin et al. |
| 5,331,875 A | 7/1994 | Mayfield |
| 5,377,554 A | 1/1995 | Reulein et al. |
| 5,377,571 A | 1/1995 | Josephs |
| 5,392,678 A | 2/1995 | Sasaki et al. |
| 5,411,221 A | 5/1995 | Collins et al. |
| 5,471,888 A | 12/1995 | McCormick |
| 5,510,685 A | 4/1996 | Grasselli |
| 5,513,548 A | 5/1996 | Garuglieri |
| 5,534,836 A | 7/1996 | Schenkel et al. |
| 5,572,916 A | 11/1996 | Takano |
| 5,587,618 A | 12/1996 | Hathaway |
| 5,606,889 A | 3/1997 | Bielinski et al. |
| 5,667,152 A | 9/1997 | Mooring |
| 5,671,633 A | 9/1997 | Wagner |
| 5,695,306 A | 12/1997 | Nygren, Jr. |
| 5,724,875 A | 3/1998 | Meredith et al. |
| 5,730,165 A | 3/1998 | Philipp |
| 5,755,148 A | 5/1998 | Stumpf et al. |
| 5,771,742 A | 6/1998 | Bokaie et al. |

| | | |
|---|---|---|
| 5,782,001 A | 7/1998 | Gray |
| 5,787,779 A | 8/1998 | Garuglieri |
| 5,791,057 A | 8/1998 | Nakamura et al. |
| 5,791,223 A | 8/1998 | Lanzer |
| 5,791,224 A | 8/1998 | Suzuki et al. |
| 5,852,951 A | 12/1998 | Santi |
| 5,861,809 A | 1/1999 | Eckstein et al. |
| 5,875,698 A | 3/1999 | Ceroll et al. |
| 5,921,367 A | 7/1999 | Kashioka et al. |
| 5,937,720 A | 8/1999 | Itzov |
| 5,942,975 A | 8/1999 | Sorensen |
| 5,943,932 A | 8/1999 | Sberveglieri |
| 5,950,514 A | 9/1999 | Benedict et al. |
| 5,963,173 A | 10/1999 | Lian et al. |
| 5,974,927 A | 11/1999 | Tsune |
| 5,989,116 A | 11/1999 | Johnson et al. |
| 6,018,284 A | 1/2000 | Rival et al. |
| 6,037,729 A | 3/2000 | Woods et al. |
| 6,052,884 A | 4/2000 | Steckler et al. |
| 6,095,092 A | 8/2000 | Chou |
| 6,119,984 A | 9/2000 | Devine |
| 6,133,818 A | 10/2000 | Hsieh et al. |
| 6,148,504 A | 11/2000 | Schmidt et al. |
| 6,150,826 A | 11/2000 | Hokodate et al. |
| 6,170,370 B1 | 1/2001 | Sommerville |
| 6,244,149 B1 | 6/2001 | Ceroll et al. |
| 6,257,061 B1 | 7/2001 | Nonoyama et al. |
| 6,366,099 B1 | 4/2002 | Reddi |
| 6,376,939 B1 | 4/2002 | Suzuki et al. |
| 6,404,098 B1 | 6/2002 | Kayama et al. |
| 6,405,624 B1 | 6/2002 | Sutton |
| 6,418,829 B1 | 7/2002 | Pilchowski |
| 6,420,814 B1 | 7/2002 | Bobbio |
| 6,430,007 B1 | 8/2002 | Jabbari |
| 6,431,425 B1 | 8/2002 | Moorman et al. |
| 6,450,077 B1 | 9/2002 | Ceroll et al. |
| 6,453,786 B1 | 9/2002 | Ceroll et al. |
| 6,460,442 B1 | 10/2002 | Talesky et al. |
| 6,471,106 B1 | 10/2002 | Reining |
| 6,479,958 B1 | 11/2002 | Thompson et al. |
| D466,913 S | 12/2002 | Ceroll et al. |
| 6,492,802 B1 | 12/2002 | Bielski |
| D469,354 S | 1/2003 | Curtsinger |
| 6,502,493 B1 | 1/2003 | Eccardt et al. |
| 6,536,536 B1 | 3/2003 | Gass et al. |
| 6,543,324 B1 | 4/2003 | Dils |
| 6,546,835 B1 | 4/2003 | Wang |
| 6,575,067 B1 | 6/2003 | Parks et al. |
| 6,578,460 B1 | 6/2003 | Sartori |
| 6,578,856 B1 | 6/2003 | Kahle |
| 6,595,096 B1 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B1 | 9/2003 | Wang |
| 6,640,683 B1 | 11/2003 | Lee |
| 6,644,157 B1 | 11/2003 | Huang |
| 6,647,847 B1 | 11/2003 | Hewitt et al. |
| 6,736,042 B1 | 5/2004 | Behne et al. |
| 6,826,988 B1 | 12/2004 | Gass et al. |
| 6,857,345 B1 | 2/2005 | Gass et al. |
| 2001/0032534 A1 | 10/2001 | Cerroll et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017183 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0059855 A1 | 5/2002 | Gass et al. |
| 2002/0066346 A1 | 6/2002 | Gass et al. |
| 2002/0069734 A1 | 6/2002 | Gass et al. |
| 2002/0096030 A1 | 7/2002 | Wang |
| 2002/0109036 A1 | 8/2002 | Denen et al. |
| 2002/0170399 A1 | 11/2002 | Gass et al. |
| 2002/0170400 A1 | 11/2002 | Gass |
| 2002/0190581 A1 | 12/2002 | Gass et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0056853 A1 | 3/2003 | Gass et al. |
| 2003/0058121 A1 | 3/2003 | Gass et al. |
| 2003/0074873 A1 | 4/2003 | Freiberg et al. |
| 2003/0089212 A1 | 5/2003 | Parks et al. |
| 2003/0090224 A1 | 5/2003 | Gass et al. |
| 2003/0101857 A1 | 6/2003 | Chuang |
| 2003/0109798 A1 | 6/2003 | Kermani |
| 2003/0131703 A1 | 7/2003 | Gass et al. |
| 2003/0140749 A1 | 7/2003 | Gass et al. |
| 2004/0040426 A1 | 3/2004 | Gass et al. |
| 2004/0226424 A1 | 11/2004 | OBanion et al. |

FOREIGN PATENT DOCUMENTS

| | | |
|---|---|---|
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1998 |
| ES | 2152184 | 1/2001 |
| FR | 2556643 | 6/1985 |
| FR | 2570017 | 3/1986 |
| GB | 598204 | 2/1948 |
| GB | 2096844 | 10/1982 |
| GB | 2142571 | 1/1985 |

OTHER PUBLICATIONS

U.S. Provisional Patent Appl. No. 60/182,866, filed Feb. 16, 2000, entitled "Fast–Acting Safety Stop.".

IWF 2000 Challenges Award Official Entry Form, submitted Apr. 26, 2000, 6 pages plus CD (the portions of US patent applications referenced in the form are from U.S. Appl. No. 60/157,340 filed Oct. 1, 1999 and U.S. Appl. No. 60/182,866 filed Feb. 16, 2000).

* cited by examiner

SAFETY SYSTEMS FOR POWER EQUIPMENT

CROSS-REFERENCE TO RELATED APPLICATIONS

This application is a continuation of U.S. patent application Ser. No. 10/215,929, filed Aug. 9, 2002 now abandoned, which claims the benefit of and priority from U.S. Provisional Patent Application Ser. No. 60/312,141, filed Aug. 13, 2001. Both of the above applications are hereby incorporated by reference in their entirety for all purposes.

BACKGROUND

Beginning with the industrial revolution and continuing to the present, mechanized equipment has allowed workers to produce goods with greater speed and less effort than possible with manually-powered tools. Unfortunately, the power and high operating speeds of mechanized equipment creates a risk for those operating such machinery. Each year thousands of people are maimed or killed by accidents involving power equipment.

As might be expected, many systems have been developed to minimize the risk of injury when using power equipment. Probably the most common safety feature is a guard that physically blocks an operator from making contact with dangerous components of machinery, such as belts, shafts or blades. In many cases, guards are effective to reduce the risk of injury, however, there are many instances where the nature of the operations to be performed precludes using a guard that completely blocks access to hazardous machine parts.

Various systems have been proposed to prevent accidental injury where guards cannot effectively be employed. For instance, U.S. Pat. Nos. 941,726, 2,978,084, 3,011,610, 3,047,116, 4,195,722 and 4,321,841, the disclosures of which are incorporated herein by reference, all disclose safety systems for use with power presses. These systems utilize cables attached to the wrists of the operator that either pull back a user's hands from the work zone upon operation or prevent operation until the user's hands are outside the danger zone. U.S. Pat. Nos. 3,953,770, 4,075,961, 4,470, 046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine.

U.S. Pat. Nos. 4,959,909, 5,025,175, 5,122,091, 5,198, 702, 5,201,684, 5,272,946, and 5,510,685 disclose safety systems for use with meat-skinning equipment, and are incorporated herein by reference. These systems interrupt or reverse power to the motor, or disengage a clutch, upon contact with a user's hand by any dangerous portion of the machine. Typically, contact between the user and the machine is detected by monitoring for electrical contact between a fine wire mesh in a glove worn by the user and some metal component in the dangerous area of the machine. Although such systems are suitable for use with meat skinning machines, they are relatively slow to stop the motion of the cutting element because they rely on the operation of solenoids or must overcome the inertia of the motor. However, because these systems operate at relatively low speeds, the blade does not need to be stopped rapidly to prevent serious injury to the user.

U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid. Unfortunately, such a system is prone to false triggers and is relatively slow acting because of the solenoid. U.S. Pat. No. 4,117,752, which is herein incorporated by reference, discloses a similar braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms–1 s to stop the blade. Therefore, the system is too slow to stop the blade quickly enough to avoid serious injury.

None of these existing systems have operated with sufficient speed and/or reliability to prevent serious injury with many types of commonly used power tools. Although proximity-type sensors can be used with some equipment to increase the time available to stop the moving pieces, in many cases the user's hands must be brought into relatively close proximity to the cutting element in the normal course of operation. For example, many types of woodworking equipment require that the user's hands pass relatively close to the cutting tools. As a result, existing proximity-type sensors, which are relatively imprecise, have not proven effective with this type of equipment. Even where proximity sensors are practical, existing brake systems have not operated quickly enough to prevent serious injury in many cases.

In equipment where proximity-type detection have not proven effective, the cutting tool must stop very quickly in the event of user contact to avoid serious injury. By way of example, a user may feed a piece of wood through a table saw at a rate of approximately one foot per second. Assuming an average reaction time of approximately one-tenth of a second, the hand may have moved well over an inch before the user even detects the contact. This distance is more than sufficient to result in the loss of several digits, severing of vital vessels and tendons, or even complete severing of a hand. If a brake is triggered immediately upon contact with the saw's blade, the blade must be stopped within approximately one-hundredth of a second to limit the depth of injury to one-eighth of an inch. Standard solenoids or other electromagnetic devices are generally not designed to act in this time scale, particularly where significant force must be generated. For instance, in the case of solenoids or electromagnetic brakes that operate on 60 hz electrical power, it is possible that the power line will be at a phase that has low voltage at the time the brake is triggered and several milliseconds may elapse before the voltage reaches a sufficient level even to begin physical displacement of the brake, much less achieve a complete stoppage of the blade or cutting tool.

DETAILED DESCRIPTION

Figure 1:
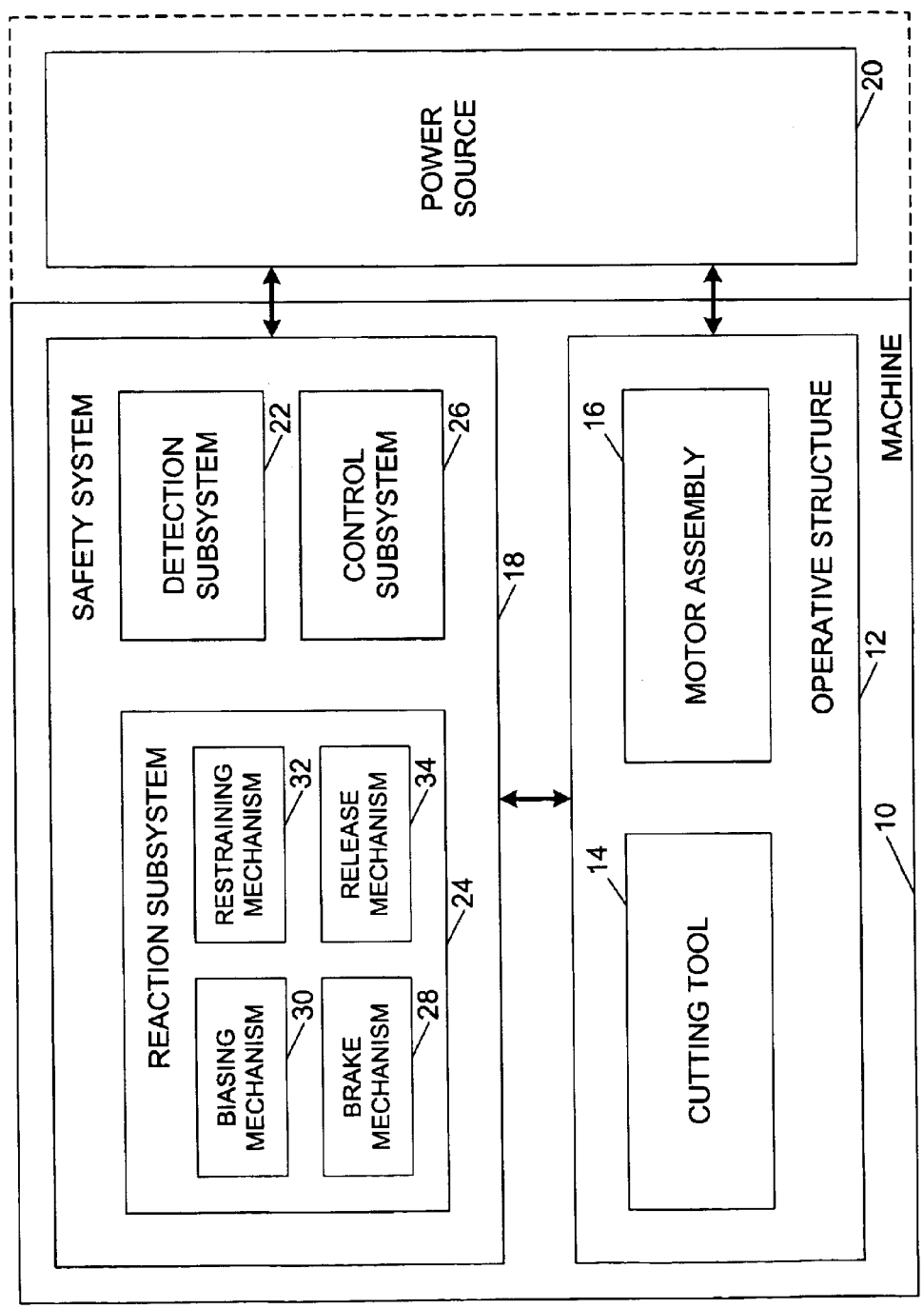
FIG. 1 is a schematic block diagram of a machine with a fast-acting safety system according to the present invention.

A machine according to the present invention is shown schematically in FIG. 1 and indicated generally at 10.

Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, such as is described in U.S. Provisional Patent Application Ser. No. 60/182,866, filed Feb. 16, 2000, and U.S. Pat. No. 4,267,914, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000, entitled "Cutting Tool Safety System," the disclosure of which is herein incorporated by reference. Retraction of the cutting tool from its operating position and/or the stopping of translational motion of the cutting tool are described in more detail in the following U.S. Provisional Patent Applications, all the disclosures of which are herein incorporated by reference: Ser. No. 60/225,089, filed Aug. 14, 2000, entitled "Retraction System For Use In Power Equipment," Ser. No. 60/270,941, filed Feb. 22, 2001, entitled "Power Saw with Improved Safety System," Ser. No. 60/270,942, filed Feb. 22, 2001, entitled "Miter Saw with Improved Safety System," Ser. No. 60/273,177, filed Mar. 2, 2001, entitled "Table Saw With Improved Safety System," Ser. No. 60/273,178, filed Mar. 2, 2001, entitled "Miter Saw with Improved Safety System," Ser. No. 60/273,902, filed Mar. 6, 2001, entitled "Miter Saw with Improved Safety System," Ser. No. 60/275,594, filed Mar. 13, 2001, entitled "Miter Saw with Improved Safety System," Ser. No. 60/275,595, filed Mar. 13, 2001, entitled "Safety Systems for Power Equipment," Ser. No. 60/279,313, filed Mar. 27, 2001, entitled "Miter Saw with Improved Safety System," and Ser. No. 60/292,081, filed May 17, 2001, entitled "Translation Stop for Use in Power Equipment."

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
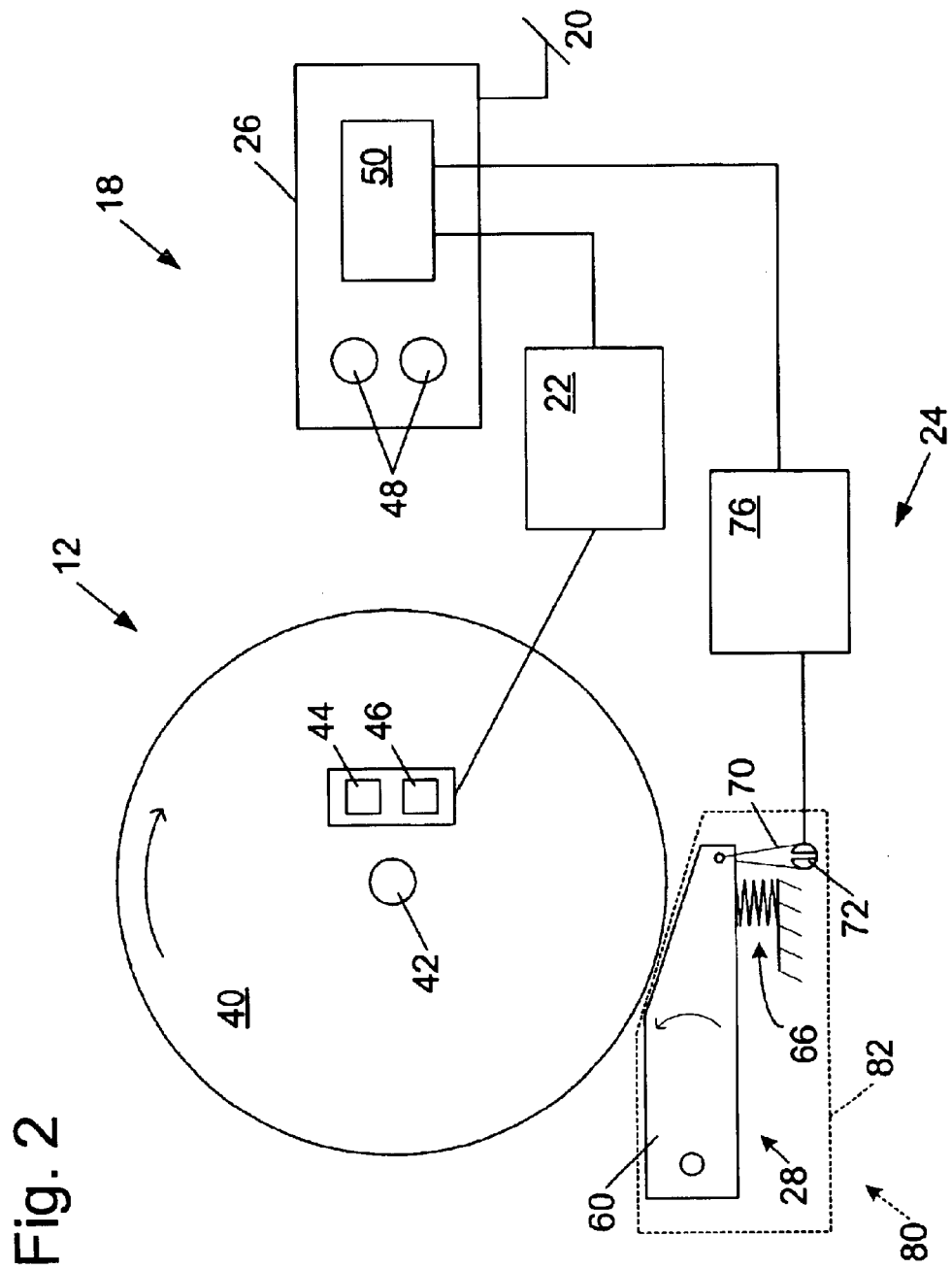
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, filed Aug. 14, 2000, entitled "Translation Stop For Use In Power Equipment," and U.S. Provisional Patent Application Ser. No. 60/233,459, filed Sep. 18, 2000, entitled "Translation Stop For Use In Power Equipment," the disclosures of which are herein incorporated by reference, describe other systems for stopping the movement of the cutting tool. Although the embodiment depicted in FIGS. 1 and 2 schematically illustrate machine 10 as a generic woodworking machine, it will be appreciated that safety system 18 may be incorporated into virtually any specific type of woodworking machine. For example, the following U.S. Provisional Patent Applications, the disclosures of which are herein incorporated by reference, describe safety system 18 in the context of various specific types of machines such as table saws, miter saws, radial arm saws, band saws, pneumatic up-cut saws, routers, etc.: U.S. Provisional Patent Application Ser. No. 60/225,058, filed Aug. 14, 2000, entitled "Table Saw With Improved Safety System," U.S. Provisional Patent Application Ser. No. 60/225,057, filed Aug. 14, 2000, entitled "Miter Saw With Improved Safety System," U.S. Provisional Patent Application Ser. No. 60/233,459, filed Sep. 18, 2000, entitled "Translation Stop For Use In Power Equipment," U.S. Provisional Patent Application Ser. No. 60/270,941, filed Feb. 22, 2001, entitled "Power Saw With Improved Safety System," U.S. Provisional Patent Application Ser. No. 60/270,942, filed Feb. 22, 2001, entitled "Miter Saw With Improved Safety System," U.S. Provisional Patent Application Ser. No. 60/273,177, filed Mar. 2, 2001, entitled "Table Saw With Improved Safety System," U.S. Provisional Patent Application Ser. No. 60/273,178, filed Mar. 2, 2001, entitled "Miter Saw With Improved Safety System," U.S. Provisional Patent Application Ser. No. 60/273,902, filed Mar. 6, 2001, entitled "Miter Saw With Improved Safety System," U.S. Provisional Patent Application Ser. No. 60/275,594, filed Mar. 13, 2001, entitled "Miter Saw With Improved Safety System," U.S. Provisional Patent Application Ser. No. 60/275,595, filed Mar. 13, 2001, entitled "Safety Systems For Power Equipment," U.S. Provisional Patent Application Ser. No. 60/279,313, filed Mar. 27, 2001, entitled "Miter Saw With Improved Safety System," U.S. Provisional Patent Application Ser. No. 60/292,081, filed May 17, 2001, entitled "Translation Stop For Use In Power Equipment," U.S. Provisional Patent Application Ser. No. 60/292,100, filed May 17, 2001, entitled "Band Saw with Improved Safety System," U.S. Provisional Patent Application Ser. No. 60/298,207, filed Jun. 13, 2001, entitled "Apparatus And Method For Detecting Dangerous Conditions In Power Equipment," and U.S. Provisional Patent Application Ser. No. 60/306,202, filed Jul. 18, 2001, entitled "Router With Improved Safety System."

In the exemplary implementation, detection subsystem 22 is adapted to detect the dangerous condition of the user coming into contact with blade 40. The detection subsystem includes a sensor assembly, such as contact detection plates 44 and 46, configured to detect any contact between the user's body and the blade. The detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, entitled "Contact Detection System For Power Equipment," U.S. Provisional Patent Application Ser. No. 60/225,211, filed Aug. 14, 2000, entitled "Apparatus And Method For Detecting Dangerous Conditions In Power Equipment," U.S. Provisional Patent Application Ser. No. 60/270,011, filed Feb. 20, 2001, entitled "Contact Detection System for Power Equipment," U.S. Provisional Patent Application Ser. No. 60/292,100, filed May 17, 2001, entitled "Band Saw With Improved Safety System," U.S. Provisional Patent Application Ser. No. 60/298,207, filed Jun. 13, 2001, entitled "Apparatus And Method For Detecting Dangerous Conditions In Power Equipment," and U.S. Provisional Patent Application Ser. No. 60/302,937, filed Jul. 2, 2001, entitled "Discrete Proximity Detection System," the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, entitled "Logic Control For Fast Acting Safety System," and U.S. Provisional Patent Application Ser. No. 60/225,094, filed Aug. 14, 2000, entitled "Motion Detecting System For Use In Safety System For Power Equipment," the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, entitled "Firing Subsystem For Use In Fast Acting Safety System," U.S. Provisional Patent Application Ser. No. 60/225,170, filed Aug. 14, 2000, entitled "Spring-Biased Brake Mechanism for Power Equipment," and U.S. Provisional Patent Application Ser. No. 60/225,169, filed Aug. 14, 2000, entitled "Brake Mechanism For Power Equipment," U.S. Provisional Patent Application Ser. No. 60/279,313, filed Mar. 27, 2001, entitled "Miter Saw With Improved Safety System," U.S. Provisional Patent Application Ser. No. 60/292,081, filed May 17, 2001, entitled "Translation Stop For Use In Power Equipment," U.S. Provisional Patent Application Ser. No. 60/292,100, filed May 17, 2001, entitled "Band Saw With Improved Safety System," U.S. Provisional Patent Application Ser. No. 60/302,916, filed Jul. 3, 2001, entitled "Actuators For Use With Fast-Acting Safety Systems," and U.S. Provisional Patent Application Ser. No. 60/307,756, filed Jul. 25, 2001, entitled "Actuators For Use With Fast-Acting Safety Systems," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, entitled "Replaceable Brake Mechanism For Power Equipment," U.S. Provisional Patent Application Ser. No. 60/225,212, filed Aug. 14, 2000, entitled "Brake Positioning System," U.S. Provisional Patent Application Ser. No. 60/279,313, filed Mar. 27, 2001, entitled "Miter Saw With Improved Safety System," U.S. Provisional Patent Application Ser. No. 60/306,202, filed Jul. 18, 2001, entitled "Router With Improved Safety System," U.S. Provisional Patent Application Ser. No. 60/302,916, filed Jul. 3, 2001, entitled "Actuators For Use With Fast-Acting Safety Systems," and U.S. Provisional Patent Application Ser. No. 60/307,756, filed Jul. 25, 2001, entitled "Actuators For Use With Fast-Acting Safety Systems," the disclosures of which are herein incorporated by reference.

Additional variations and modifications of safety system 18 are described in U.S. Provisional Patent Application Ser. No. 60/182,866, filed Feb. 16, 2000, and 60/157,340, filed Oct. 1, 1999, both entitled "Fast-Acting Safety Stop," the disclosures of which are herein incorporated by reference.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A saw comprising:
   a blade configured to move to cut a work piece, where the blade includes a cutting edge;
   a motor adapted to move the blade;
   a detection system adapted to detect contact between a person and the blade while the blade is moving and to distinguish that contact from contact between green wood and the blade by imparting a signal to the blade and monitoring that signal for a predetermined rate of change indicative of contact with a person; and
   a replaceable brake cartridge adapted to stop the blade when the detection system detects contact between a person and the blade, the brake cartridge including:

a housing;

a brake pawl pivotally connected with the housing and having a blade-contact surface;

a biasing mechanism at least partially enclosed by the housing and adapted to urge the brake pawl to pivot relative to the housing; and a release mechanism at least partially enclosed by the housing and adapted to release the brake pawl to pivot relative to the housing under the urging of the biasing mechanism when the detection system detects contact between a person and the blade;

where the brake cartridge is positioned in the saw so that the blade-contact surface can pivot into contact with the cutting edge of the blade to stop the blade.

2. The saw of claim 1, further comprising a frame supporting the blade, and where the blade is electrically isolated from the frame.

3. The saw of claim 1 where the detection system is adapted to capacitively impart an electric signal on the blade and to detect the occurrence of a determined change in the signal.

4. The saw of claim 1, where the biasing mechanism includes a spring configured to pivot the brake pawl.

5. The saw of claim 1, where the release mechanism includes a fuse wire that is melted upon detection of contact between the person and the blade.

6. The saw of claim 1 where the blade is circular and the blade-contact surface is spaced radially outward from the cutting edge of the blade when the brake cartridge is positioned in the saw.

7. The saw of claim 1, where the machine is a table saw.

8. The saw of claim 1, where the machine is a miter saw.

9. The saw of claim 1, where the machine is a radial arm saw.

10. The saw of claim 1, where the machine is a circular saw.

11. The saw of claim 1, where the machine is a hand-held circular saw.

12. The saw of claim 1, further including electronics associated with the release mechanism, where the electronics are enclosed within the housing.

13. The saw of claim 1, where the housing is sealed against the entry of sawdust.

14. The saw of claim 1, where the detection system is capacitively coupled to the blade.

15. The saw of claim 14, where the capacitive coupling between the detection system and the blade includes a drive electrode and a sense electrode.

16. The saw of claim 1, further including a control system adapted to monitor the detection system and control actuation of the release mechanism.

17. The saw of claim 16, where the control system is adapted to shut off the motor when contact between a person and the blade is detected.

18. The saw of claim 16, where the control system is adapted to verify that the brake cartridge is in the saw before power is supplied to the motor.

19. The saw of claim 16, where the control system is adapted to test the operability of the release mechanism.

20. The saw of claim 16, where the control system is adapted to verify the brake cartridge is positioned in the saw so that the blade-contact surface can pivot into contact with the cutting edge of the blade to stop the blade.

* * * * *